(12) United States Patent
Rahman et al.

(10) Patent No.: US 11,715,267 B2
(45) Date of Patent: Aug. 1, 2023

(54) METHODS AND SYSTEMS FOR PROVIDING OPERATIONAL SUPPORT TO AN EXTENDED REALITY PRESENTATION SYSTEM

(71) Applicant: Verizon Patent and Licensing Inc., Basking Ridge, NJ (US)

(72) Inventors: Masudur Rahman, Whitehouse Station, NJ (US); Hardik Gandhi, Parsippany, NJ (US); Yong Sang Cho, Old Tappan, NJ (US); Monte Giles, Chester, NJ (US); Ruben Cuadrat, Basking Ridge, NJ (US); Anand J. Shah, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 117 days.

(21) Appl. No.: 17/245,864

(22) Filed: Apr. 30, 2021

(65) Prior Publication Data
US 2022/0351468 A1  Nov. 3, 2022

(51) Int. Cl.
*G06T 19/00*     (2011.01)
*G06F 9/455*     (2018.01)

(52) U.S. Cl.
CPC ........ *G06T 19/006* (2013.01); *G06F 9/45558* (2013.01); *G06F 2009/45595* (2013.01)

(58) Field of Classification Search
CPC ............... G06F 2111/18; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS

| | | | | |
|---|---|---|---|---|
| 10,440,096 B2 * | 10/2019 | Sabella | ............ | H04W 28/0205 |
| 2018/0183855 A1 * | 6/2018 | Sabella | ............ | H04W 52/0264 |
| 2020/0065627 A1 * | 2/2020 | Kaufhold | ............ | G06F 18/2148 |
| 2021/0306281 A1 * | 9/2021 | Vilgelm | ............... | H04L 47/805 |
| 2022/0351468 A1 * | 11/2022 | Rahman | ............... | G06T 19/006 |

FOREIGN PATENT DOCUMENTS

| | | | | |
|---|---|---|---|---|
| WO | WO-2020023115 A1 * | 1/2020 | .......... | G06F 9/5033 |
| WO | WO-2020255384 A1 * | 12/2020 | ............ | G06F 3/012 |
| WO | WO-2021194583 A1 * | 9/2021 | .......... | G06F 9/5033 |

\* cited by examiner

*Primary Examiner* — Todd Buttram

(57) ABSTRACT

An extended reality (XR) support system establishes a communicative link between an XR presentation system and a multi-access edge compute (MEC) system operating on a cellular network. The XR support system identifies a parameter associated with a computing task to be performed in connection with an XR experience presented by the XR presentation system. The XR support system also identifies a condition associated with a capability of the XR presentation system or the MEC system to perform the computing task. Based on the identified parameter and the identified condition, the XR support system selects at least one of the XR presentation system or the MEC system to perform the computing task and then directs the selected system to perform the computing task. Corresponding methods and systems are also disclosed.

20 Claims, 9 Drawing Sheets

METHODS AND SYSTEMS FOR PROVIDING OPERATIONAL SUPPORT TO AN EXTENDED REALITY PRESENTATION SYSTEM

BACKGROUND INFORMATION

Various types of extended reality (XR) technologies are being developed, deployed, and used by users to engage in various types of XR experiences. As one example, virtual reality technologies provide virtual reality experiences whereby users become fully immersed in a virtual reality world in which they can move about within virtual spaces and see, hear, and/or interact with virtual objects and/or virtual avatars of other users. As another example, augmented reality technologies (also referred to as mixed reality technologies) provide augmented reality experiences whereby users continue to experience the real world around them to at least some extent (e.g., seeing real objects in their environment by way of a partially transparent heads-up display, video passed through from a head-mounted camera, hand-held device, etc.) while also being presented with virtual elements and augmentations that do not exist in the real world.

Significant computing (e.g., high-fidelity graphics rendering, real-time world modeling, realistic audio propagation simulation, etc.) may be required to provide certain XR experiences. However, while local processing resources of an XR presentation system (e.g., resources integrated in a head-mounted device, resources of a smartphone to which a head-mounted device is tethered, etc.) may be capable of performing such computing in certain situations, it may not be practical or possible for local processing resources to perform all such computing tasks adequately or on a suitable timeline (e.g., in real time) in other situations. Additionally, designing more processing resources into XR presentation systems to make them more capable tends to result in devices that are heavier, bulkier, more obtrusive and conspicuous, and otherwise less desirable for users to wear. Moreover, processing improvements also generally exacerbate design challenges related to battery life, heat dissipation, and so forth.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
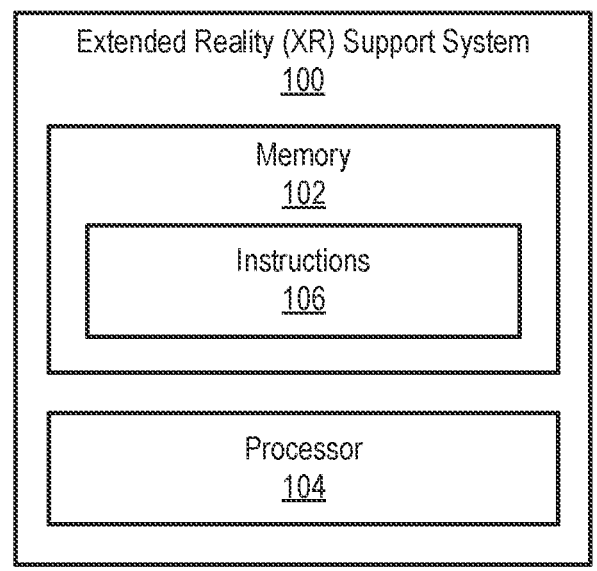
FIG. 1 shows an illustrative extended reality (XR) support system configured to provide operational support to an XR presentation system according to embodiments described herein.

Methods and systems for providing operational support to an extended reality (XR) presentation system are described herein. As mentioned above, certain types of XR experiences may involve significant computing efforts, which may not only require powerful processing and abundant memory resources, but may also use a large amount of electrical power, generate significant amounts of heat, and so forth. For example, high-fidelity graphics rendering, real-time world modeling, realistic audio propagation simulation, and other such computing tasks associated with presenting high quality and highly immersive XR experiences may only be made possible by processing significant amounts of data in very short periods of time. Additionally, as further mentioned above, challenges in this realm may not be adequately addressed by simply designing in more powerful or abundant computing resources to XR presentation systems. While doing so might help to accomplish the desired computing tasks within a target amount of time, the added resources may only exacerbate challenges related to battery life, heat dissipation, and cost. Moreover, for XR presentation devices that are to be worn on the head (rather than carried by hand or used at a desk, etc.), the weight and form factor (e.g., style, appearance, bulkiness, etc.) of the devices may be highly important to the end user. Unfortunately, these considerations are also made more challenging when additional computing resources are added to the devices, since additional processing and memory resources (and associated circuitry and heat dissipation mechanisms, etc.) tend to cause devices to become larger, heavier, bulkier, and so forth.

To address one or more of these challenges (e.g., all of these challenges in certain implementations), XR support systems and methods described herein are configured to provide operational support to XR presentation systems in various ways. As one example, XR support systems may facilitate XR presentation systems in connecting to and communicating with external processing systems (e.g., processing systems separate from the XR presentation systems that the user is wearing or carrying) that may be configured to take on certain computing tasks that the XR presentation system offloads to reduce workload, increase processing output, decrease power usage, and so forth.

For instance, as 5G network technologies develop and become more widespread, one type of external processing system that is well suited for sharing in XR computing efforts is a multi-access edge compute (MEC) system that operates on a cellular network (e.g., a 5G cellular network) and is configured to perform computing tasks offloaded by many different user devices with extremely low latencies. In many examples, MEC systems are configured to be so responsive, and are located so physically close on the network to the location of the user devices, that total latencies (e.g., compute latencies combined with communication transport latencies, etc.) may be negligible or nearly negligible on a human scale (e.g., within a few milliseconds such that a human is unable or unlikely to perceive any lag or delay). At the same time, as powerful server computers managed by cellular providers in well-designed data centers, MEC systems are not constrained by size, weight, power consumption, heat dissipation, and other such concerns to the same extent as user-worn devices (e.g., there may be much more flexibility in the server realm for how such challenges may be addressed). Conventional cloud compute systems may also provide some of the same advantages as described above for MEC systems, albeit without being able to achieve the same low latencies characterizing MEC systems (which may or may not be important, depending on the nature of a particular computing task that is to be offloaded).

Consequently, XR support systems and methods described herein may be configured to provide a connection between XR presentation systems and MEC systems or other external systems. As will be described, these systems and methods may also facilitate communications by providing an abstraction layer that selects which computing tasks are to be performed by the local resources of the XR presentation system itself, which computing tasks are to be offloaded to external computing resources of an available MEC system in the vicinity, which computing tasks are to be offloaded to other available computing resources (e.g., resources of a cloud compute system), and so forth. By abstracting this away from an XR application executing on the XR presentation system, the XR application (which may be developed by a third party application developer unrelated to the cellular network provider or the XR presentation system hardware provider) may focus on what computing is to be performed to provide the best XR experience to the user, rather than being burdened with concerns about which resources will perform which computing tasks, how power and heat tradeoffs are to be weighted in making such decisions, and so forth. As will be described in more detail below, the XR support system may account for these types of conditions and ensure that computing tasks are distributed between local and external resources in an optimal way.

As another example of how XR support systems and methods described herein may provide operational support to XR presentation systems, XR support systems may enable XR presentation systems to be separated into at least two separate subsystems housed in separate housings and worn on different parts of the body to increase the convenience, comfort, muscle strain, style appeal, and other aspects of wearing an XR presentation system. For example, as will be described and illustrated herein, an XR presentation system may include a user interface subsystem that may be worn on the head (e.g., a head-mounted device) and that is contained within a first housing (e.g., a housing associated with a set of XR glasses, etc.), as well as a communication subsystem that may be worn on the neck, shoulders, or another convenient place near the head (e.g., a neck-mounted device) and that is contained within a second housing (e.g., a housing that rests on the neck or shoulders, a housing that integrates with clothing items worn by the user, etc.).

While the user interface subsystem may display XR content to the eyes of the user, capture imagery seen by the user, and detect the user's movements (e.g., head turns, etc.), the communication subsystem may provide a communicative link (e.g., 5G network communication to MEC systems, etc.) to the XR presentation system to allow computing tasks to be offloaded to external systems as may be appropriate under given conditions and circumstances. The communication subsystem may also provide battery power to the user interface subsystem (e.g., sole battery power to certain user interface subsystems or additional battery power to other user interface subsystems that integrate their own battery power supplies). Processing resources performing the XR support system functionality (e.g., the tasks assignment abstraction described above) may be implemented by processing resources included in either or both of the subsystems of the XR presentation system, as will be described and illustrated in more detail below.

XR support systems and methods described herein for providing operational support to XR presentation systems may provide various benefits and advantages. For example, these systems and methods may allow XR presentation devices to be implemented with lighter weight and more streamlined and attractive (e.g., less bulky) designs as processing resource requirements are lowered due to the possibility of offloading processing to MEC systems and other external devices. In examples involving separate subsystems worn on the head and neck, weight that is carried by the head itself may also be advantageously decreased by offloading some or all of the battery resources to be carried on the neck and shoulders, where it may be convenient for a user to carry a longer-life battery in a more comfortable way. In certain examples, such advantages may be provided with a convenient and inconspicuous tether (e.g., a cable only a few inches long) that extends from the head to the neck, rather than, for example, a longer tether extending from the head to a smartphone or other device carried in a pocket.

Another illustrative benefit is that XR support systems and methods described herein may abstract the details of real-time selection of which computing resources to perform which computing tasks to thereby allow XR applications to be agnostic to these details and focus on the computing tasks that are to be performed (rather than how and where the tasks can be performed most optimally). Additionally, XR support system implementations integrated within a communication subsystem (e.g., a neck-mounted device) may be configured to plug-and-play not only with existing XR software applications, but also with existing XR hardware devices (e.g., head-mounted devices). Leveraging these novel neck-mounted XR support systems (when connected by way of a short cable), even conventional head-mounted XR hardware devices that have previously not had access to cellular network may be enabled to access and receive all the advantages provided by 5G networks, MEC systems, and other emerging technologies. Meanwhile, new head-mounted XR hardware devices may be designed from the ground up to account for the offloaded battery power and 5G network connectivity provided by neck-mounted XR support systems to allow these head-mounted devices to be more lightweight, inconspicuous, streamlined, and attractive than ever.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for providing operational support to an XR presentation system may provide any of the benefits mentioned above, as well as various additional and/or alternative benefits that will be described and/or made apparent below.

FIG. 1 shows an illustrative XR support system 100 ("system 100") configured to provide operational support to an XR presentation system in accordance with principles described herein. System 100 may be implemented by computer resources such as processors, memory facilities, storage facilities, communication interfaces, and so forth. For example, system 100 may be partially or fully implemented by computing resources of XR reality presentation systems (e.g., resources of head-mounted devices, neck-mounted devices, etc.), mobile devices (e.g., smartphones, tablet devices, etc.), personal computers, or other equipment used directly by end users. In certain examples, system 100 may be communicatively coupled with and/or at least partially implemented by computing systems that are located remotely from users and XR presentation systems used by the users. For example, such computing systems may include distributed computing systems operated by a cellular data provider (e.g., MEC systems), distributed computing systems operated by a cloud-computing provider (e.g., multi-access cloud compute systems), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with providing operational support to an XR presentation system as described herein and/or as may serve a particular implementation.

Figure 2:
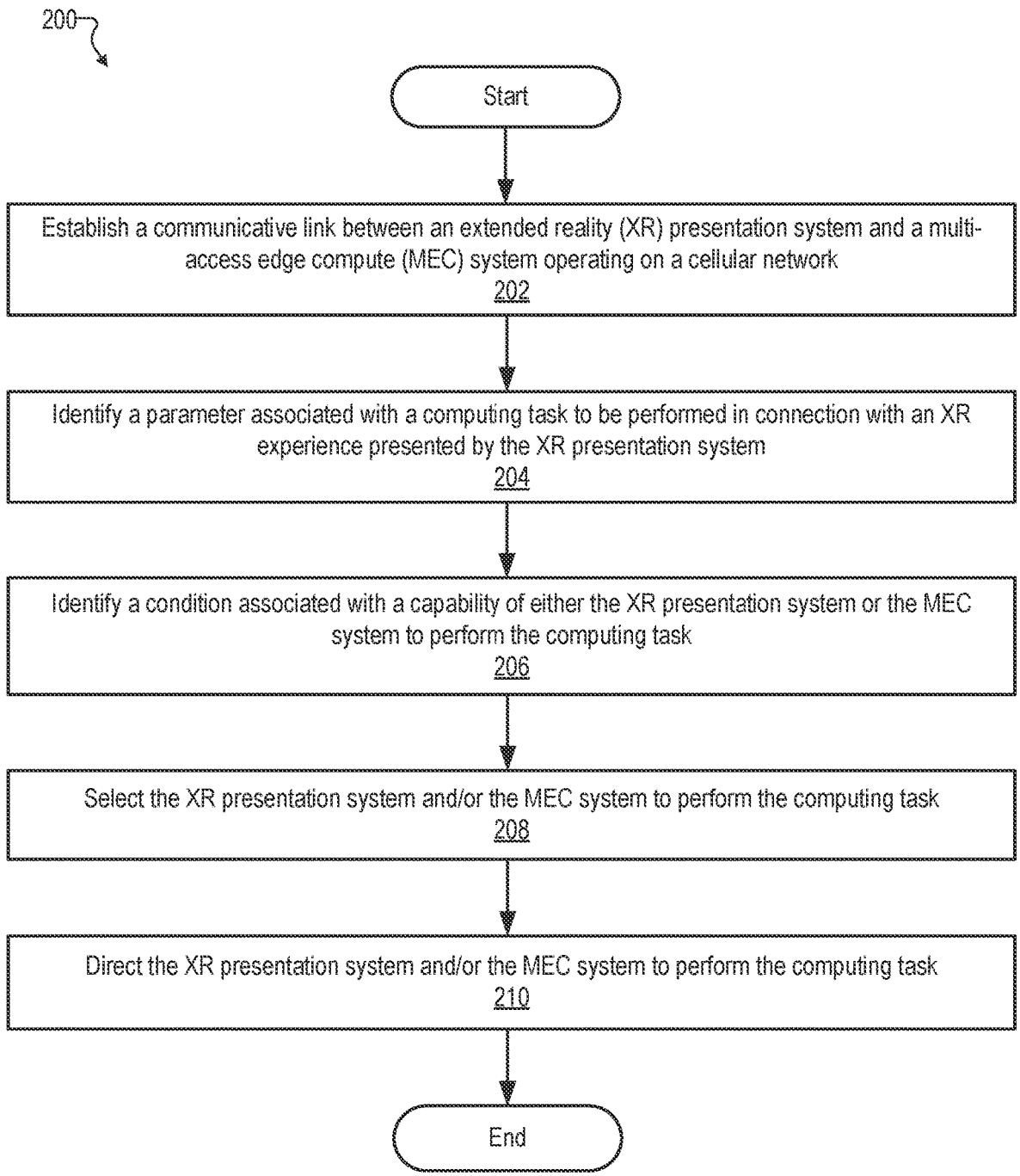
FIG. 2 shows an illustrative method for providing operational support to an XR presentation system according to embodiments described herein.

As one example of functionality that processor 104 may perform, FIG. 2 shows an illustrative method 200 for providing operational support to an XR presentation system in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an XR support system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-210 of method 200 will now be described in more detail as the operations may be performed by system 100 (e.g., by processor 104 as processor 104 executes instructions 106 stored in memory 102).

At operation 202, system 100 may establish a communicative link between an XR presentation system and a multi-access server system such as a MEC system operating on a cellular network or another such application server system (e.g., a cloud-based multi-access server system, etc.) that is accessible by way of the cellular network and/or one or more other networks (e.g., a wide area network, the Internet, etc.). In the example that the communicative link is to a MEC system, system 100 may establish the communicative link by way of the cellular network, which the XR presentation system may be connected to by way of cellular communication circuitry (e.g., a cellular chipset, radio transmitter/receiver, antenna, etc.) that may be provided by system 100 or another associated system. As mentioned above and as will be described and illustrated in more detail below, for example, a communication subsystem implemented as a neck-mounted device may implement cellular communication and provide cellular connectivity to a user interface subsystem implemented as a head-mounted device in certain implementations. In this way, the head-mounted device may receive all the benefits described herein without itself implementing any cellular communication circuitry with its associated weight, space constraints, power constraints, emissions footprint, and so forth.

System 100 may establish the communicative link between the XR presentation system (in which system 100 may be implemented, as will be described in more detail below) and the MEC system or other application server system at operation 202 in any suitable way. For instance, in certain implementations, system 100 may itself provide the cellular network connectivity (e.g., by implementing cellular communication circuitry and performing software functions to establish and maintain a connection to the cellular network). In other implementations, system 100 may establish the communicative link at operation 202 by gaining access to and using, for the operations described below, a connection to the cellular network that is provided by a related system. For example, in a scenario in which system 100 is implemented by a head-mounted device of the XR presentation system, system 100 may establish the communicative link by way of a connection to a cellular network provided by cellular communication circuitry implemented by a neck-mounted device of the XR presentation system.

At operation 204, system 100 may identify a parameter associated with a computing task to be performed in connection with an XR experience presented by the XR presentation system. As used herein, a computing task may refer to any instruction or group of instructions that is to be performed by computing resources of a computing system such as local resources of an XR presentation system or external resources of a MEC or cloud system. As a few non-limiting examples, certain illustrative computing tasks may relate to mapping the real-world around the user (e.g., performing simultaneous localization and mapping (SLAM) operations), other illustrative computing tasks may relate to graphics rendering (e.g., generating a mesh based on a point cloud, texturing the mesh, raytracing to simulate light illuminating the textured mesh to create accurate shading, etc.), and still other illustrative computing tasks may relate to audio rendering (e.g., simulating virtual sound propagation within a purely virtual scene or within an augmented reality scene that includes real and virtual objects that may influence the virtual sound propagation). Many of these types of operations may be relatively processing intensive, such that it may be helpful to offload some or all the work associated with these tasks to external computing resources if possible. Other computing tasks, however, may be less processing intensive or may require specific sensors, input/output device, or other resources that are only available locally. For example, computing tasks involving tracking objects captured in an incoming video stream or displaying graphics and/or audio that has already been rendered and prepared may often be performed optimally by local resources of an XR presentation system.

In either situation, the parameter identified at operation 204 may define and set forth any information about a particular computing task that is to be accounted for as system 100 determines which computing resources are to perform the computing task. For example, the parameter associated with the computing task may indicate a timing target (e.g., a target latency, etc.) for the computing task, an anticipated processing load associated with the computing task (e.g., a processing throughput that the computing task will require, etc.), special considerations associated with the computing task (e.g., information about where data is stored that is to be processed by the computing task, whether special resources only available locally or on external devices are to be used to perform the task, etc.), and/or any other information that system 100 may account for in determining the most optimal computing resources to perform the computing task.

At operation 206, system 100 may identify various conditions and circumstances (e.g., real-time conditions and/or circumstances) related to availability of various computing resources. For example, at operation 206, system 100 may identify a condition associated with a capability of the XR presentation system to perform the computing task, a condition associated with a capability of the MEC system to perform the computing task, and/or any other conditions relevant to capabilities of available computing resources to perform the computing task as may serve a particular implementation. For example, as will be described in more detail below, conditions associated with the capability of the XR presentation system to perform the computing task may include the current battery life of the XR presentation system or the temperature at which the system is operating, the workload associated with tasks that are already assigned to the XR presentation system resources, or the like. Similarly, conditions associated with the capability of the MEC system to perform the computing task may include real-time transport and/or computing latencies associated with the MEC system, how far away the MEC system is located from the XR presentation system, what resources (e.g., how many GPU cores, etc.) are available at the MEC system and the current workload of these resources, and so forth.

At operation 208, system 100 may account for any or all the parameters and/or conditions that have been identified at operations 204 and 206 to determine which computing resources are to perform the computing task. More specifically, at operation 208, system 100 may select, based on the identified parameter from operation 204 and the identified condition from operation 206, at least one of the XR presentation system or the MEC system to perform the computing task. In certain examples, operation 208 may involve selecting for the task to be performed by either the XR presentation system or the MEC system, while, in other examples, operation 208 may involve selecting for the work associated with certain computing tasks to be divided up in a particular way between the XR presentation system and the MEC system.

At operation 210, system 100 may direct the selected system (e.g., the XR presentation system, the MEC system, the combination of both of these, or another selected system or combination such as a cloud system) to perform the computing task. For example, system 100 may direct the computing task to be performed by local resources (e.g., integrated GPU cores, an integrated CPU processor, etc.) of the XR presentation system or may transmit the instruction (s) of the computing task to be performed by computing resources of the MEC system. In this way, system 100 may abstract these details away from high level XR application code executing on the XR presentation system and/or the MEC system, ensuring that whatever computing tasks may be called for by the XR application will be performed in an efficient, effective, and timely manner by computing resources that are well-situated to perform the task in light of the nature of the task and the current conditions and circumstances.

Figure 3:
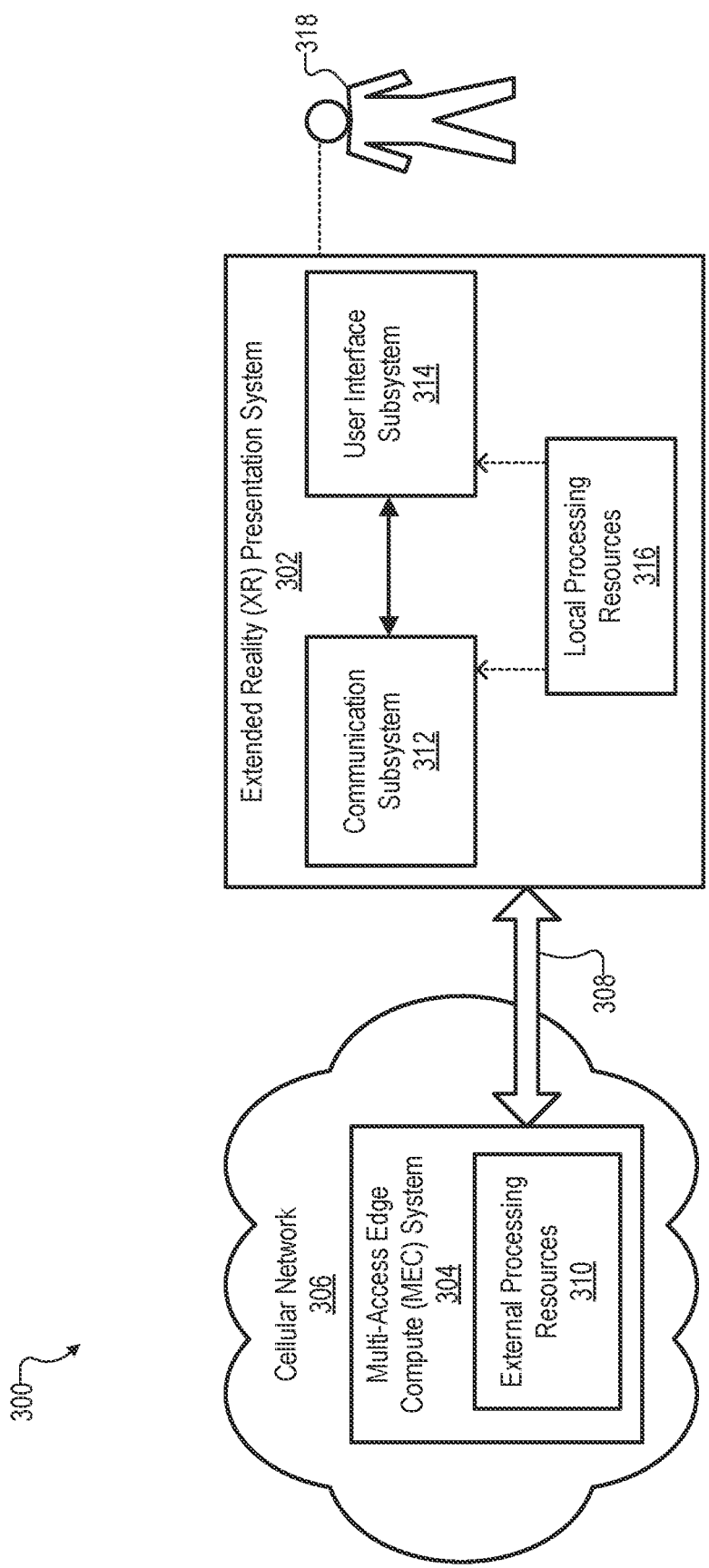
FIG. 3 shows an illustrative configuration in which the XR support system of FIG. 1 may operate according to embodiments described herein.

FIG. 3 shows an illustrative configuration 300 in which system 100 may operate in accordance with principles described herein. As shown, configuration 300 includes an extended reality (XR) presentation system 302 that is connected to a multi-access edge compute (MEC) system 304 operating on a cellular network 306. A communicative link 308 between XR presentation system 302 and MEC system 304 (e.g., the communicative link 308 established at operation 202 of method 200) is also shown. MEC system 304 may include external processing resources 310 such as processors (e.g., CPUs, GPUs, etc.), memory, storage, and so forth.

In some examples, MEC system 304 may be implemented by one or more large servers in a data center operated by a provider of cellular network 306 (e.g., a 5G cellular data network or other suitable network on which MEC system 304 operates and to which XR presentation system 302 is connected). As such, external processing resources 310 may be relatively powerful and abundant (e.g., including hundreds or thousands of available processor cores, many terabytes of memory and/or storage, etc.) so as to be able to perform computing tasks for a plurality of XR presentation systems and other systems and devices that it may be configured to serve (only one of which, XR presentation system 302, is shown in FIG. 3). It will be understood that MEC system 304 may be implemented on the "edge" of cellular network 306, such as at a node of cellular network 306 that is relatively nearby XR presentation system 302 to provide the short latencies described above.

XR presentation system 302 may be implemented by one or more devices configured to present an XR experience to a user. For example, XR presentation system 302 may include a communication subsystem 312 (e.g., implemented by a neck-mounted device in one implementation), a user interface subsystem 314 (e.g., implemented by a head-mounted device in one implementation), and local processing resources 316 that may be included in either or both of communication subsystem 312 and user interface subsystem 314. XR presentation system 302 may be used by (e.g., worn by, operated by, etc.) a user 318 as user 318 engages in an XR experience. As will be described in more detail below, user interface subsystem 314 may be configured to present visual content of the XR experience to user 318, to detect movement of user 318 during the XR experience, and in certain examples, to perform other operations including operations associated with system 100 and/or computing tasks assigned by system 100. In certain implementations, communication subsystem 312 may be housed separately from user interface subsystem 314 (e.g., in a neck-mounted device while user interface subsystem 314 is housed in a head-mounted device in one example) and may be configured to connect to cellular network 306 to enable communicative link 308 between XR presentation system 302 and MEC system 304. Communication subsystem 312 may also provide battery power to user interface subsystem 314 and/or perform other operations including operations associated with system 100 and/or computing tasks assigned by system 100.

Whether housed in communication subsystem 312, user interface subsystem 314, or distributed between the two subsystems, local processing resources 316 may be relatively modest computing resources, at least in comparison with external processing resources 310. Not only does the form factor of XR presentation system 302 create more limitations on local processing resources 316 (these resources being housed in small and light wearable devices rather than in large servers implementing MEC system 304, as is the case with external processing resources 310), but power resources, heat dissipation, cost considerations, and various other factors may also necessarily constrain local processing resources 316 to be less capable than external processing resources 310. However, because local processing resources 316 are located locally and dedicated only to XR presentation system 302 (rather than being shared by lots of XR presentation systems and/or other devices connected to cellular network 306), there may still be various advantages (e.g., latency advantages, processing and cost efficiencies, etc.) to performing some computing tasks on local processing resources 316. As described above in relation to method 200 (and as will be further described below), system 100 may be configured to provide operational support to XR presentation system 302 in part by determining which computing resources (e.g., external processing resources 310 or local processing resources 316) to employ for a particular computing task.

While system 100 is not explicitly depicted in configuration 300, it will be understood that system 100 may be implemented by local processing resources 316 included in either communication subsystem 312 or user interface subsystem 314 (or a combination of both), or, in certain examples, by external processing resources 310 of MEC system 304. Whichever computing resources are used to implement system 100, system 100 may perform operations 202-210 of method 200 and/or any other operations described herein to provide operational support to XR presentation system 302 and produce any of the benefits and advantages thereof that are described herein. An illustrative embodiment in which system 100 is implemented within communication subsystem 312 will be described and illustrated below in relation to FIG. 7, and an illustrative implementation in which system 100 is implemented within user interface subsystem 314 will be described and illustrated below in relation to FIG. 8.

Figure 4:
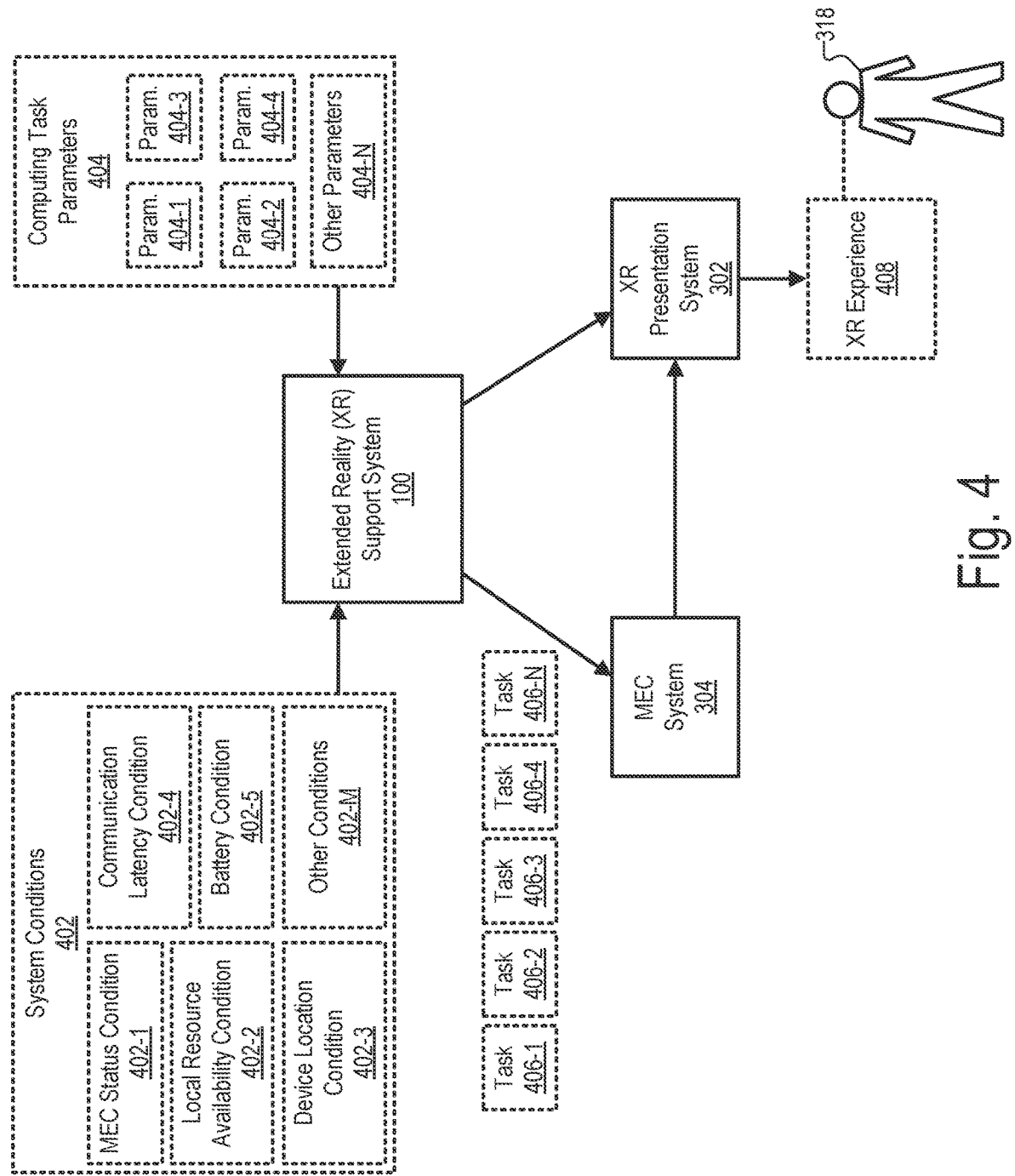
FIGS. 4-6 show illustrative aspects of how an XR support system may select an XR presentation system or a multi-access edge compute (MEC) system to perform computing tasks according to embodiments described herein.
Figure 5:
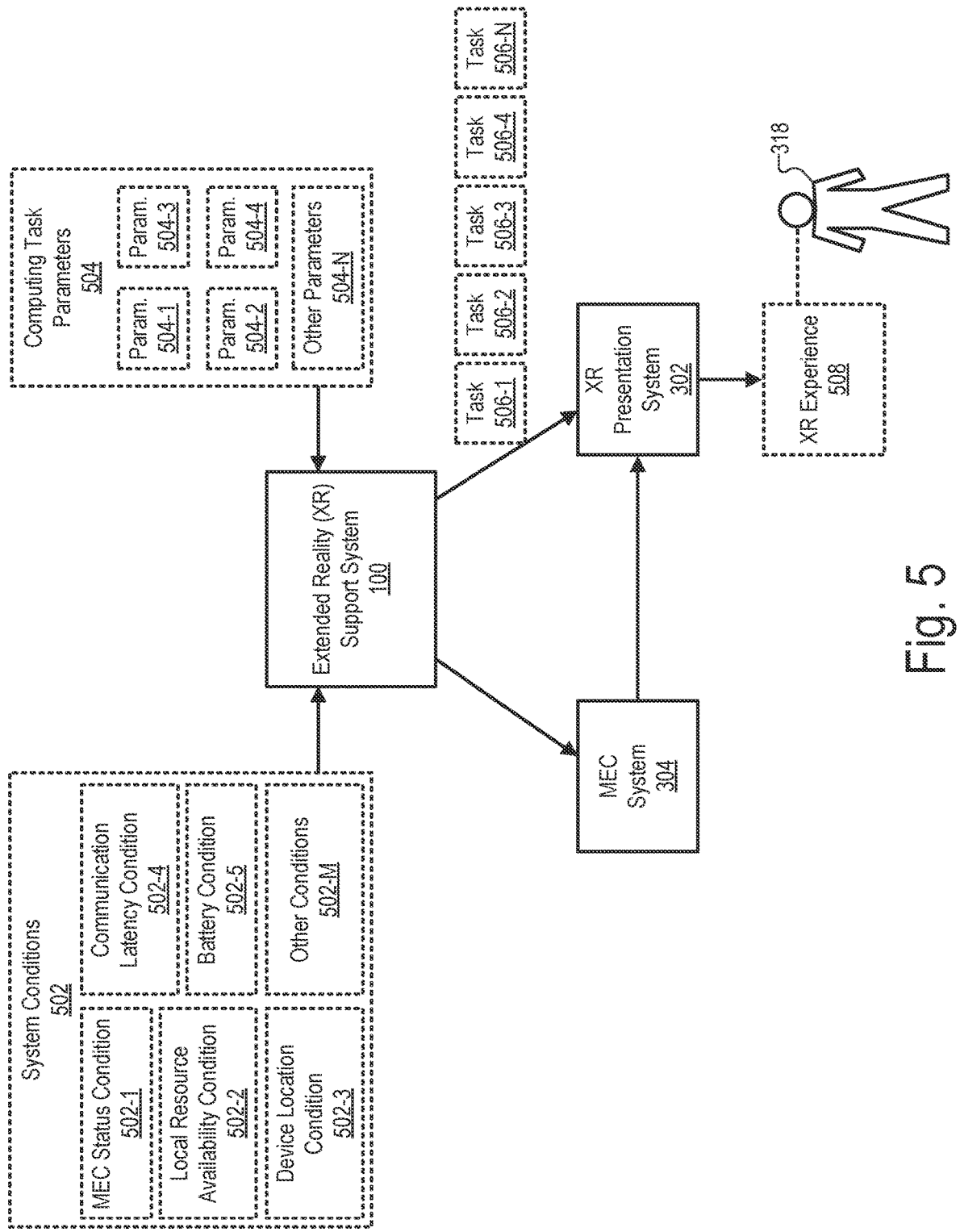
Figure 6:
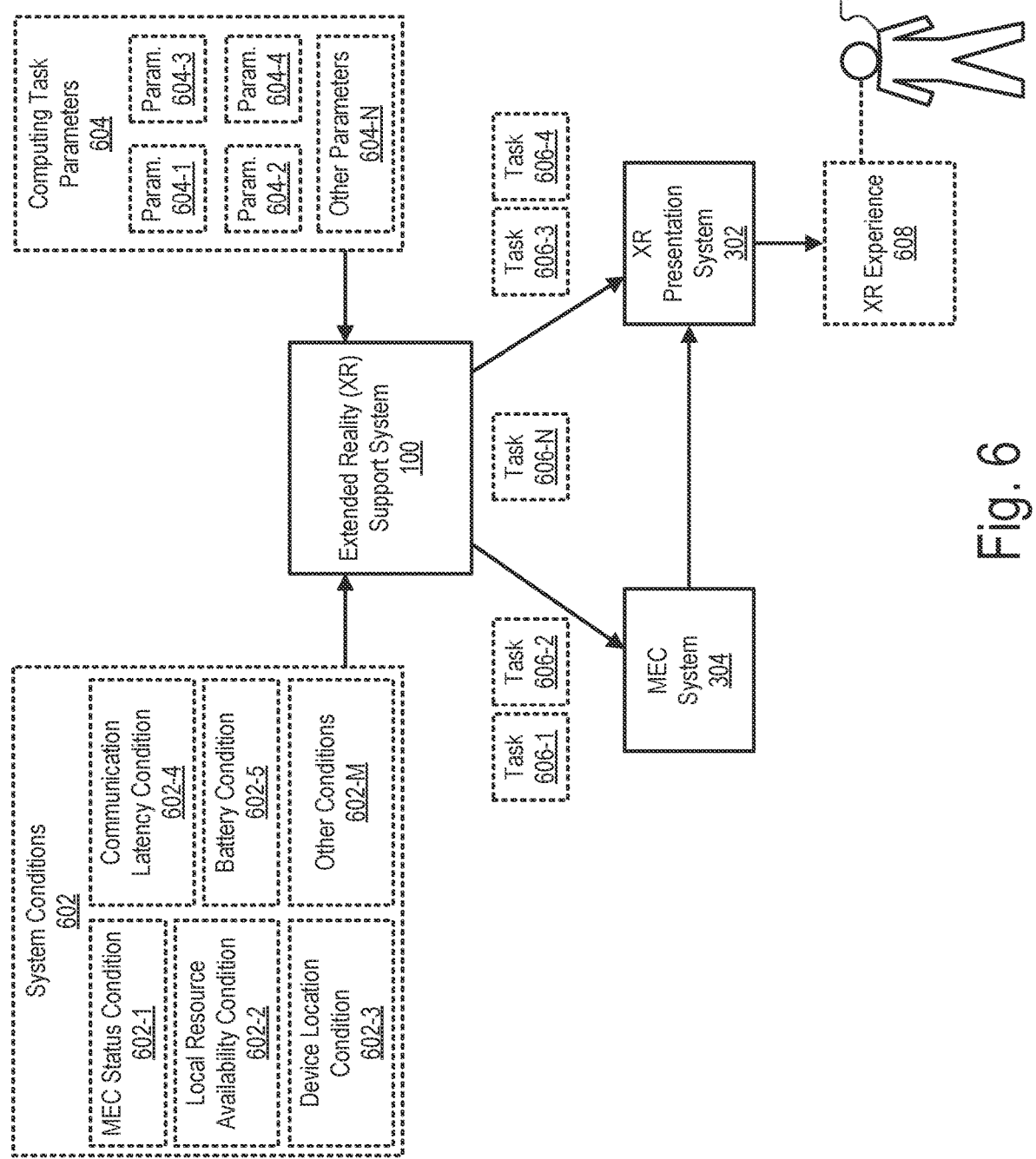

FIGS. 4-6 show illustrative aspects of how system 100 may select a MEC system (FIG. 4), an XR presentation system (FIG. 5), or a combination of both (FIG. 6) to perform computing tasks in accordance with principles described herein. In each example, system conditions and computing task parameters may be such that system 100 selects for computing tasks to be performed using different computing resources to generate an XR experience that XR presentation system 302 presents to user 318. Each of these examples associated with FIGS. 4-6 will now be described.

In the example of FIG. 4, system 100 is shown to identify a plurality of system conditions 402 (e.g., conditions 402-1 through 402-M) and to identify a plurality of computing task parameters 404 (e.g., task parameters 404-1 through 404-N) that will be understood to correspond to a plurality of computing tasks 406 (e.g., corresponding, respectively, to computing tasks labeled as tasks 406-1 through 406-N). For example, the identifying of system conditions 402 may be performed in accordance with operation 206 (described above in relation to method 200 in FIG. 2) and the identifying of computing task parameters 404 may be performed in accordance with operation 204.

As shown by various non-limiting examples in FIG. 4, a variety of different types of conditions may be included among system conditions 402, each of which may be associated with the capability of either or both of MEC system 304 and XR presentation system 302 to perform computing tasks 406 (e.g., a particular one of computing tasks 406-1 through 406-N or any of computing tasks 406 generally). Specifically, as shown, these examples include a MEC status condition 402-1, a local resource availability condition 402-2, a device location condition 402-3, a communication latency condition 402-4, and a battery condition 402-5. Various other types of other conditions 402-M may also be included among system conditions 402. In certain examples, some or all of system conditions 402 may be real-time system conditions that may be determined (e.g., by system 100 or another suitable device or network diagnostic system) on demand and/or in real time to reflect conditions and circumstances as they exist at a current moment in time.

MEC status condition 402-1 may be associated with the capability of MEC system 304 to perform computing tasks 406. More particularly, MEC status condition 402-1 may indicate a processing resource availability of MEC system 304. The processing resource availability indicated by MEC status condition 402-1 may relate generally to what processing resources are included within MEC system 304 (or within a plurality of different MEC systems that are in a vicinity of XR presentation system 302). In other examples, the processing resource availability may relate specifically to a current processing load of processing resources of a particular MEC system (e.g., MEC system 304) or to which of the processing resources included within the particular MEC system are currently available (e.g., not in use or having a processing load less than a predetermined threshold). Processing resources included within MEC system 304 refer to resources used to perform computing tasks (e.g., GPU cores or other processors, etc.). However, in addition or as an alternative to indicating availability of processing resources of MEC 304, MEC status condition 402-1 may indicate availability of other computing resources (e.g., communication resources) associated with MEC system 304 and/or a network between system 100 and MEC system 304 (e.g., cellular network 306). For instance, MEC status condition 402-1 may indicate a bandwidth, throughput, and/or usage statistics for network communications of MEC system 304 and/or cellular network 306.

Local resource availability condition 402-2 may be associated with the capability of XR presentation system 302 to perform computing tasks 406. More particularly, local resource availability condition 402-2 may indicate any of the types of processing resource availability or other types of resource availability described above for MEC system 304, but for XR presentation system 302 instead of MEC system 304. For example, when a communication subsystem 312 such as a neck-mounted device establishes a connection (e.g., a USB or other connection as will be described below) with a user interface subsystem 314 such as a head-mounted device, the communication subsystem 312 may determine what the XR processing capabilities of the user interface subsystem 314 are (e.g., which resources the user interface subsystem 314 includes or has available, whether the user interface subsystem 314 even houses its own processing resources or is configured to rely on the resources of the communication subsystem 312 and/or MEC system 304, etc.).

Device location condition 402-3 may be associated with the capability of both XR presentation system 302 and MEC system 304 to perform computing tasks 406. This is because device location condition 402-3 may indicate where XR presentation system 302 is located with respect to one or more MEC systems (including MEC system 304) and, therefore, what resource options may be available for performing the computing tasks at a given moment. For example, device location condition 402-3 may indicate a real-time location of XR presentation system 302. For example, this location may be determined based on coordinates detected by a Global Positioning System (GPS) system included within XR presentation system 302, based on a geolocation of an access point to which XR presentation system 302 is connected, based on a triangulation of the location of XR presentation system 302 using a plurality of signals received from a plurality of signal sources (e.g., access points, base stations, etc.) at known locations, based on dead reckoning techniques, or in any other suitable manner. Based on this real-time location, as well as a map of where MEC system 304 and/or other MEC systems of a cellular network are located, system 100 may determine whether it is currently possible to offload computing tasks 406 to any MEC system, and, if it is possible, which MEC system 304 of the network will be most accessible (e.g., the MEC system most proximate to the real-time location of XR presentation system 302, the most proximate MEC system that meets certain performance or availability criteria, etc.).

As with device location condition 402-3, communication latency condition 402-4 may be associated with the capability of both XR presentation system 302 and MEC system 304 to perform computing tasks 406. Specifically, communication latency condition 402-4 may indicate a real-time latency between XR presentation system 302 and MEC system 304, determined based on latency measurements, predicted based on device location condition 402-3 and real-time network traffic conditions, and/or determined in other ways as may serve a particular implementation. In some examples, communication latency condition 402-4 may represent transport latency for information between XR presentation system 302 and MEC system 304 (e.g., accounting for total distance, number of hops, network traffic, etc.). In other examples, communication latency condition 402-4 may represent computing latency for a particular computing task 406 at a particular MEC system 304 (e.g., accounting for resource availability at the MEC system 304, task parameters 604 of the particular computing task 406, etc.). In still other examples, communication latency condition 402-4 may represent both transport latency and computing latency, as well as any other suitable factors as may contribute to a total latency in a particular implementation.

Battery condition 402-5 may be associated with the capability of XR presentation system 302 to perform computing tasks 406. Specifically, battery condition 402-5 may indicate a battery level of XR presentation system 302, which may assist system 100 in determining whether the additional power anticipated to be consumed by a particular computing task 406 (e.g., based on task parameters 404) is acceptable or whether computing task 406 should be offloaded to MEC system 304 to conserve battery power in consideration of the current battery level.

Other conditions 402-M may be associated with the capability of either XR presentation system 302 or MEC system 304 to perform computing tasks 406. For example, other conditions 402-M may indicate any other conditions relating to XR presentation system 302, MEC system 304, network communication conditions (e.g., radio conditions, etc.) between these systems, or any other relevant conditions as may serve a particular implementation.

Computing task parameters 404 may correspond to computing tasks 406 (e.g., the task parameter labeled "param. 404-1" corresponding to the computing task labeled "task 406-1," the task parameter labeled "param. 404-2" corresponding to the computing task labeled "task 406-2," etc.), and may indicate, for each computing task 406, various attributes of the computing task that may be weighed by system 100 (e.g., together with system conditions 402 and/or other criteria) as a determination is made for which resources are to perform the computing task. As one example, computing task parameters 404 may indicate what types of data and/or computing resources (e.g., GPU cores, CPU cores, available memory, streaming bandwidth, data stored at a particular location, etc.) are required for performing a particular computing task 406. As another example, computing task parameters 404 may indicate the nature of a particular computing task 406 (e.g., that the task involves rendering graphical content, that the task involves displaying prerendered graphical content, that the task involves facial recognition, that the task involves simultaneous localization and mapping, that the task involves tracking user movements based on real-time sensor data, etc.).

In some instances, system 100 may be able to determine where computing tasks 406 are to be performed based on computing task parameters 404 alone. For example, if computing task parameters 404 for a particular computing task 406 indicate that the task relates to rendering graphical content based on raytracing or that the task requires more GPU cores than are available in XR presentation system 302, system 100 may be able to determine that the particular computing task 406 may need to be assigned to MEC system 304 regardless of system conditions 402. As another example, if computing task parameters 404 for a particular computing task 406 indicate that the task relates to displaying graphical content that has already been rendered (i.e., thus requiring access to a display that the user can see), system 100 may be able to determine that the particular computing task 406 may need to be assigned to XR presentation system 302 (since MEC system 304 does not include a display that the user can see) regardless of system conditions 402. In other examples, system 100 may determine, based on computing task parameters 404 for a particular computing task 406, that the computing task 406 could potentially be performed either by XR presentation system 302 or by MEC system 304 and may use any of system conditions 402 described above (and/or other suitable criteria) to determine the optimal system or computing resources to perform the computing task 406.

In FIG. 4, based on system conditions 402 and/or computing task parameters 404, system 100 may select MEC system 304 to perform many or all of computing tasks 406 (e.g., for the selecting, by system 100 in connection with operation 208, of the at least one of XR presentation system 302 or MEC system 304 to perform a computing task 406). For example, as shown by computing tasks 406 all being directed from system 100 to MEC system 304 in FIG. 4, all of computing tasks 406 that can be offloaded to MEC system 304 may be offloaded to MEC system 304 in this example to thereby reduce power consumption (e.g., to conserve battery life), optimize performance of a relatively processing-intensive XR experience, and/or for other suitable reasons. Upon selecting MEC system 304 to perform computing tasks 406, system 100 may also direct MEC system 304 to perform the computing tasks 406 (e.g., for the directing, in connection with operation 210, of the selected at least one of XR presentation system 302 or MEC system 304 to perform the computing task 406). For example, as shown, system 100 (which may be implemented by computing resources of XR presentation system 302) may transmit computing tasks 406 to MEC system 304 with a request indicating that these tasks are to be performed by MEC system 304. As shown, when computing tasks 406 are performed by MEC system 304, these tasks may collectively implement an XR experience 408 that is provided to user 318 by XR presentation system 302.

FIGS. 5 and 6 are similar to FIG. 4, but show different system conditions (e.g., system conditions 502 in FIG. 5 and system conditions 602 in FIG. 6) and different computing task parameters (e.g., computing task parameters 504 in FIG. 5 and computing task parameters 604 in FIG. 6) being accounted for by system 100 to ultimately select different resources to perform different computing tasks (e.g., computing tasks 506 in FIG. 5 and computing tasks 606 in FIG. 6) as may best serve these examples. System conditions 502 and system conditions 602 are shown to include the same types of system conditions as described above in relation to FIG. 4 (e.g., system conditions 502-1 through 502-M corresponding, respectively, to system conditions 402-1 through 402-M; system conditions 602-1 through 602-M corresponding, respectively, to system conditions 402-1 through 402-M). Similarly, computing task parameters 504 and computing task parameters 604 are shown to include respective computing task parameters for each computing task 506 (in FIG. 5) or computing task 606 (in FIG. 6) as described above for computing task parameters 404 and computing tasks 406. When performed, computing tasks 506 implement an XR experience 508 for user 318 while computing tasks 606 implement an XR experience 608 for user 318.

In FIG. 5, based on system conditions 502 and/or computing task parameters 504, system 100 may select XR presentation system 302 to perform many or all of computing tasks 506 (e.g., for the selecting, by system 100 in connection with operation 208, of the at least one of XR presentation system 302 or MEC system 304 to perform a computing task 506). For example, as shown by computing tasks 506 all being directed from system 100 to XR presentation system 302 in FIG. 5, all of computing tasks 506 that can be performed by local resources of XR presentation system 302 may remain at XR presentation system 302 to thereby reduce network usage, reduce latency, and/or for other suitable reasons. For example, one of the identified system conditions 502 on which the selecting is based may be local resource availability condition 502-2, which may indicate that local resources available at the XR presentation system are sufficient to perform the computing task 506 without assistance from MEC system 304. When this is the case (e.g., such as for computing tasks associated with a video streaming application that provides prerendered video content that needs only to be decoded and displayed rather than rendered or otherwise processed, etc.), system 100 may determine that local resources of XR presentation system 302 may be fully capable of performing computing tasks 506 and that these local resources may be the most resource efficient option for performing the computing tasks.

Upon selecting MEC system 304 to perform computing tasks 506, system 100 may also direct XR presentation system 302 to perform the computing tasks 506 (e.g., for the directing, in connection with operation 210, of the selected at least one of XR presentation system 302 or MEC system 304 to perform the computing task 506). For example, as shown, system 100 (which may be implemented by computing resources of XR presentation system 302) may keep computing tasks 506 at XR presentation system 302 to be performed by its own local resources to thereby implement XR experience 508 for presentation to user 318.

In FIG. 6, based on system conditions 602 and/or computing task parameters 604, system 100 may select MEC system 304 to perform some of computing tasks 606 (e.g., computing tasks 606-1, 606-2, and one or more of computing tasks 606-N) while selecting XR presentation system 302 to perform other computing tasks 606 (e.g., computing tasks 606-3, 606-4, and one or more other computing tasks 606-N). In this example, system 100 may determine, based on computing task parameters 604 and system conditions 602 that certain computing tasks 606 will be performed most optimally (e.g., most effectively, efficiently, etc.) when offloaded to MEC system 304 while other computing tasks 606 will be performed most optimally when performed locally by XR presentation system 302.

Accordingly, upon making these selections for XR presentation system 302 and MEC system 304 to perform different computing tasks 606, system 100 may also direct the selected system 302 or 304 to perform the assigned computing tasks 606. For example, as shown, system 100 may transmit computing tasks 606-1 and 606-2 to be performed at MEC system 304 while keep computing tasks 606-3 and 606-4 at XR presentation system 302 to be performed by its own local resources. As these computing tasks 606 (as well as other computing tasks 606-N offloaded or locally performed in a similar way) are assigned and performed, these computing tasks 606 may collectively implement an XR experience 608 for presentation to user 318.

As mentioned above and illustrated in FIG. 3, XR presentation system 302 may, in certain examples, be implemented by separately housed subsystems such as communication subsystem 312 and user interface subsystem 314. System 100 may be implemented by at least one of these subsystems, and that same subsystem may also include the local processing resources (e.g., local processing resources 316) that are assigned to perform assigned computing tasks (e.g., computing tasks 406, 506, and/or 606 that system 100 assigns XR presentation system 302 to perform).

Figure 7:
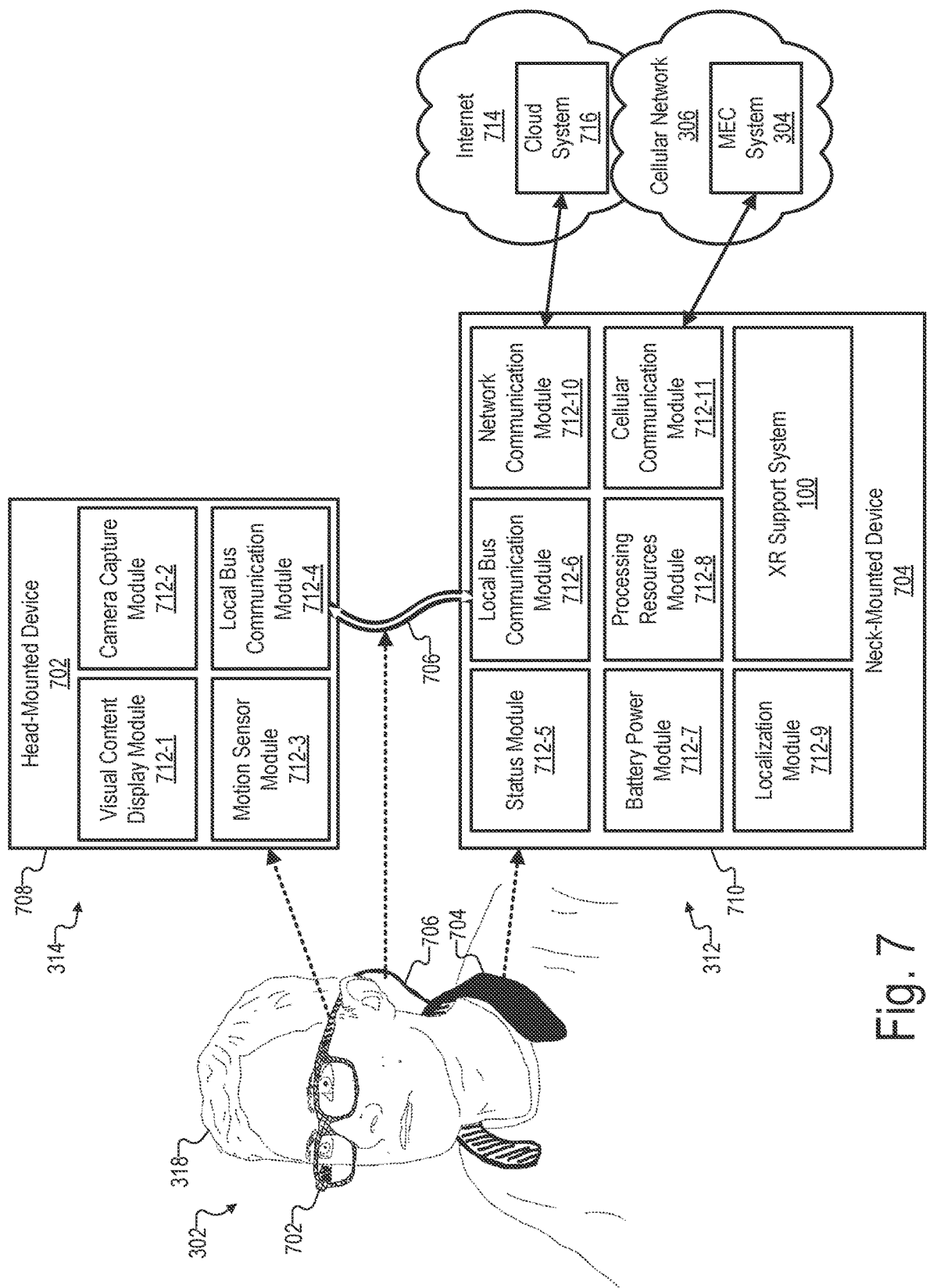
FIGS. 7-8 show different illustrative implementations of XR presentation systems that implement the XR support system of FIG. 1 in different ways according to embodiments described herein.
Figure 8:
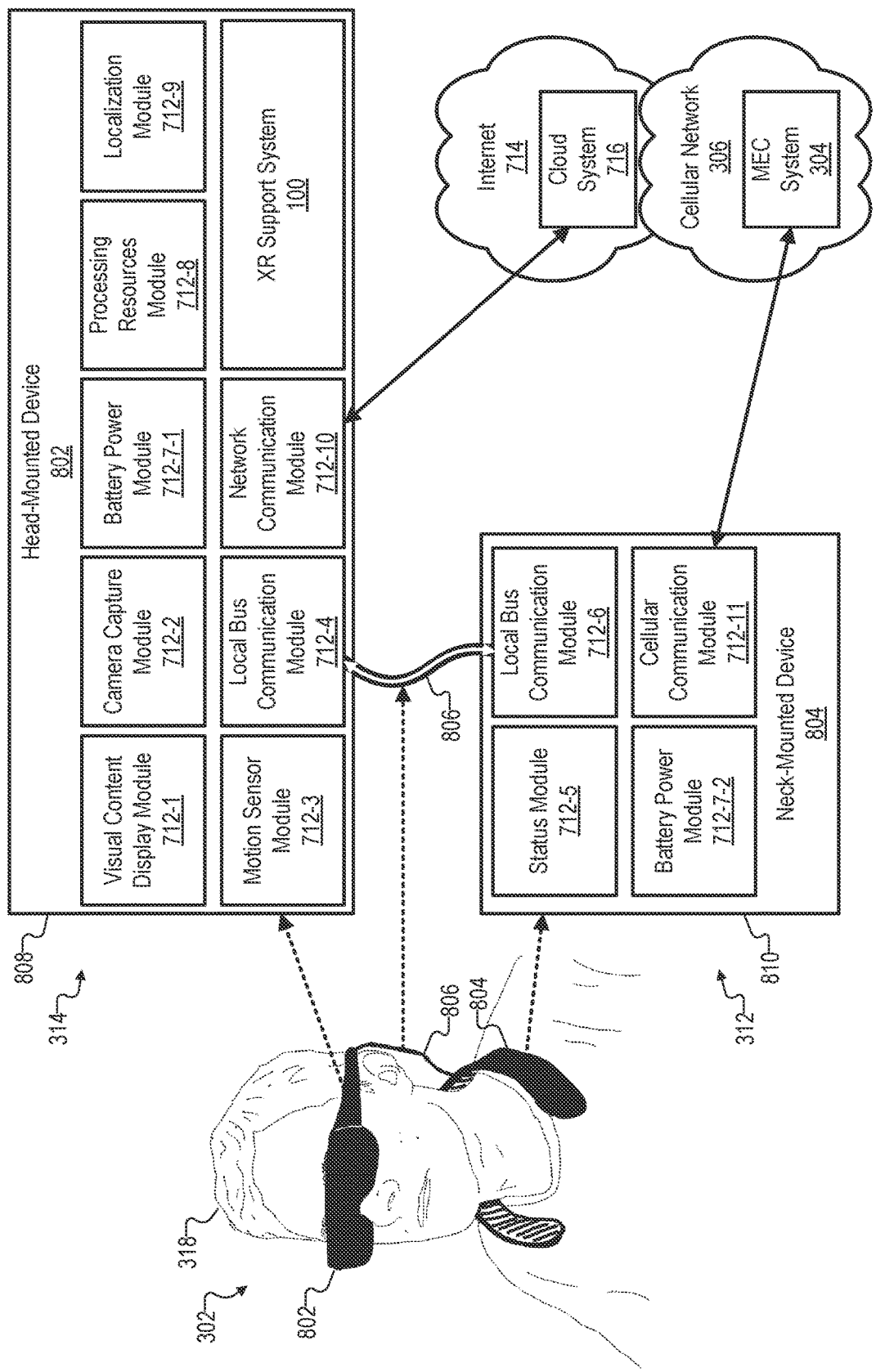

In various examples, the subsystems of XR presentation system 302 may be implemented in different ways. To illustrate, FIGS. 7-8 show different illustrative implementations of XR presentation system 302 that implement system 100 in different ways in accordance with embodiments described herein. Specifically, as will now be described and illustrated, communication subsystem 312 may implement system 100 and perform computing tasks assigned by system 100 in the example implementation illustrated in FIG. 7, while user interface subsystem 314 may implement system 100 and perform computing tasks assigned by system 100 in the example implementation illustrated in FIG. 8.

As shown in both FIGS. 7 and 8, XR presentation system 302 may be used (e.g., worn) by user 318 during an XR experience. In both examples, the illustration on the left depicts user 318 wearing an implementation of XR presentation system 302 that includes two separately-housed subsystems: 1) a head-mounted device implementing user interface subsystem 314 (i.e., a head-mounted device 702 in FIG. 7 and a head-mounted device 802 in FIG. 8), and 2) a neck-mounted device implementing communication subsystem 312 (i.e., a neck-mounted device 704 in FIG. 7 and a neck-mounted device 804 in FIG. 8). As shown in both figures, a cable (i.e., a cable 706 in FIG. 7 and a cable 806 in FIG. 8) runs between the head-mounted device and the neck-mounted device to physically and communicatively couple the two separated subsystems. Specifically, in FIG. 7, head-mounted device 702 is shown to be housed in a housing 708 (implemented as a relatively lightweight and inconspicuous pair of augmented reality glasses) that is connected by cable 706 to neck-mounted device 704, which is housed in a housing 710 (implemented as a device that rests on the shoulders and extends at least partially around the neck). Similarly, in FIG. 8, head-mounted device 802 is shown to be housed in a housing 808 (implemented as a bulkier and more conspicuous set of augmented or virtual reality goggles) that is connected by cable 806 to neck-mounted device 804, which is housed in a housing 810 (implemented similarly to housing 710 as a device configured to rest on the shoulders and extend at least partially around the neck of user 318).

As shown, and as will be made more apparent in the description below, the examples of FIGS. 7 and 8 have various similarities and differences. The similarities include, for instance, that both examples illustrate user interface subsystem 314 being implemented by a head-mounted device that presents the visual content to user 318 (e.g., to each of the user's two eyes by way of two individual screens) as the user wears the head-mounted device during an XR experience and communication subsystem 312 being implemented by a neck-mounted device that is worn by the user during the XR experience and is physically connected to the head-mounted device by way of a cable. The differences include, however, that in the example of FIG. 7 the XR support system (i.e., system 100) is implemented by local processing resources of the neck-mounted device (i.e., neck-mounted device 704), while in the example of FIG. 8 the XR support system is implemented by local processing resources of the head-mounted device (i.e., head-mounted device 802).

Additionally, while the neck-mounted device in both examples is configured to supply battery power to the head-mounted device by way of the cable, in the example of FIG. 7, neck-mounted device 704 performs assigned computing tasks using local processing resources included in neck-mounted device 704 when selected by system 100, while in the example of FIG. 8, head-mounted device 802 performs assigned computing tasks using local processing resources included in head-mounted device 802 when selected by system 100.

As shown in FIGS. 7 and 8, these similarities and differences are illustrated by the location of various modules 712 (e.g., modules 712-1 through 712-11) that are shown to be included in both implementations of XR presentation system 302, albeit in different subsystems for some of the modules. Specifically, while both examples show that modules 712-1 through 712-4 are implemented by the respective head-mounted device (i.e., head-mounted device 702 in FIG. 7 and head-mounted device 802 in FIG. 8) and that modules 712-5, 712-6, and 712-11 are implemented by the respective neck-mounted device (i.e., neck-mounted device 704 in FIG. 7 and neck-mounted device 804 in FIG. 8), modules 712-8 through 712-10 are shown to be implemented in neck-mounted device 704 in the example of FIG. 7 and in head-mounted device 802 in the example of FIG. 8. Moreover, module 712-7 is shown to be only implemented in neck-mounted device 704 in the example of FIG. 7 and to be implemented in two parts (i.e., modules 712-7-1 and 712-7-2) in both head-mounted device 802 and neck-mounted device 804 in the example of FIG. 8. Additionally, system 100 is shown to be implemented in neck-mounted device 704 in the example of FIG. 7 while being implemented in head-mounted device 802 in the example of FIG. 8.

Each of elements 702 through 712 and 802-812 will now be described in more detail in relation to the examples of FIGS. 7 and 8.

Head-mounted device 702 represents an XR device that is designed to rely on neck-mounted device 704 to provide various types of functionality (e.g., processing functions, etc.). Accordingly, as shown, head-mounted device 702 may be lightweight, inconspicuous (e.g., appearing as a normal pair of glasses), comfortable, and so forth. In order to maintain the form factor of housing 708, head-mounted device 702 may not include an onboard system on a chip (SoC), operating system (OS), or battery power. Rather, these functions may be offloaded to neck-mounted device 704 to keep head-mounted device 702 light and streamlined and producing relatively little heat. In this example, neck-mounted device 704 is shown to do all the work of XR presentation system 302 other than relatively basic functions (e.g., image capture, motions sensing, content display, etc.) that must be done at head-mounted device 702.

In contrast, head-mounted device 802 represents a virtual reality device or augmented reality device that may not be designed to function with neck-mounted device 804. For example, head-mounted device 802 may be a legacy device configured to perform all the functionality of XR presentation system 302 and that receives certain benefits (e.g., additional battery power, cellular network connectivity, etc.) by being enhanced by neck-mounted device 804. Accordingly, as shown, head-mounted device 802 may be bulkier and less streamlined than head-mounted device 702, but may implement its own SoC, OS, battery power, and so forth so that it could function as an XR presentation system by itself even without neck-mounted device 804. In this example, head-mounted device 802 is shown to do most of the work of XR presentation system 302 but to be enhanced by additional battery power and cellular network connectivity when neck-mounted device 804 is employed in the system.

Cables 706 and 806 each serve to physically connect (e.g., communicatively interconnect) the respective head-mounted device to the respective neck-mounted device. By way of these cables, the separate devices may exchange and/or transfer data and, at least in the example of FIG. 8, battery power. As shown in both examples, cables 706 and 806 may be relatively short (e.g., shorter than approximately one foot in length, shorter than approximately six inches in length, etc.), particularly when compared to a tether that may be used to physically connect a head-mounted device to a device that would be carried in a pocket or the like (e.g., a smartphone or other such device). In some examples, cables 706 and/or 806 may be implemented by universal serial bus (USB) cables or other such cables configured to transport data and power.

Different features and benefits provided by the different housings 708 and 808 were described above. Housing 710 and housing 810 of the neck-mounted device will also be understood to contribute to the overall features and benefits of a given implementation of XR presentation system 302. For example, along with features already mentioned, housing 810 may advantageously allow space for a cellular antenna to be implemented and held relatively distant from the brain and body of user 318. In this way, cellular connectivity may be achieved using neck-mounted devices 704 and 804 in a manner that satisfies certain emissions and specific absorption rate (SAR) or RF exposure regulations and/or safety standards even when these may be difficult or impossible to meet with an antenna implemented in a head-mounted device.

As shown, module 712-1 represents a visual content display module. As such, module 712-1 may include one or more display screens that are configured to be positioned directly in front of the eyes of user 318 when wearing the head-mounted device, and to present graphical content to user 318. In some examples, module 712-1 may include individual display screens for each eye so as to be able to present stereoscopically distinct images to give an appearance of three-dimensional content.

Module 712-2 represents a camera capture module. As such, module 712-2 may include one or more cameras (e.g., video cameras, still cameras, etc.) or other capture devices configured to detect images seen by user 318 (e.g., by head-mounted devices 702 or 802). In some examples, module 712-2 may capture both visual content (e.g., color content) as well as depth content, and may produce a red-green-blue-depth signal (RGB-D) signal. The depth data may be determined based on any suitable depth detection technology. For instance, module 712-2 may use a time-of-flight depth detection method or may capture two stereoscopic images that may be used to determine depth data based on triangulation techniques.

Module 712-3 represents a motion sensor module. As such, module 712-3 may include sensors such as gyroscopes, accelerometers, compasses, etc., and processing resources to capture and interpret signals from these sensors. Module 712-3 may detect head motions (e.g., head turns, etc.) and other movements of user 318 during an XR experience. Data representative of these motions and movements may then be provided to other modules to influence the visual and/or audio content that is presented to user 318.

Modules 712-4 and 712-6 represent respective local bus communication modules residing on the head-mounted device (i.e., head-mounted device 702 or head-mounted device 802) or the neck-mounted device (i.e., neck-mounted device 704 or neck-mounted device 804) to facilitate local bus (e.g., USB) communications between the head-mounted device and the neck-mounted device. As such, cables 706 and 806 are shown to extend between modules 712-4 and 712-6 in both examples of FIG. 7 and FIG. 8.

Module 712-5 represents a status module that operates on the neck-mounted device. In some implementations, neck-mounted device 704 and neck-mounted device 804 may not be configured to have user interfacing controls or indicators (e.g., buttons, status lights, screens, etc.). Accordingly, a status module implemented by module 712-5 may be configured to track various types of system status for the neck-mounted device and may send status data to the head-mounted device (e.g., by way of modules 712-6 and 712-4 and the respective cable 706 or 806). In this way, for implementations in which communication subsystem 312 (e.g., the neck-mounted device) lacks a display interface by way of which status data for the communication subsystem is presented to user 318 during the XR experience, user interface subsystem 314 (e.g., the head-mounted device) may receive the status data from communication subsystem 314 and may present the status data to user 318 along with the visual content of the XR experience (e.g., by way of module 712-1). For example, the battery status of the neck-mounted device may be tracked and indicated by module 712-5 so that module 712-1 may display a battery usage graphic to user 318 along with other XR content.

Module 712-7 represents a battery power module that operates only on neck-mounted device 704 in the example of FIG. 7. Modules 712-7-1 and 712-7-2, however, are shown to operate in the example of FIG. 8. In this example, head-mounted device 802 may include a built-in battery (module 712-7-1) that provides power to the various resources it houses, and neck-mounted device 804 may include an additional battery to extend the overall battery life of this implementation of XR presentation system 302. Each battery power module may include any suitable battery and additional power circuitry as may serve a particular implementation.

Module 712-8 represents a processing resources module that operates on neck-mounted device 704 in the example of FIG. 7 and that operates in head-mounted device 802 in the example of FIG. 8. Module 712-8 may represent one or more CPUs, GPUs, memory resources, and/or other such computing resources that may be employed for performing computing tasks that are assigned by system 100 to be performed by the local resources of XR presentation system 302 (rather than offloaded to MEC system 304). As such, module 712-8 may be understood to implement local processing resources 316 described above. Accordingly, for computing tasks (e.g., computing tasks 406, 506, or 606) that system 100 selects XR presentation system 302 to perform, these tasks may be performed by neck-mounted device 704 for an implementation like shown in FIG. 7, and by head-mounted device 802 for an implementation like shown in FIG. 8.

Module 712-9 represents a localization module that operates on neck-mounted device 704 in the example of FIG. 7 and that operates in head-mounted device 802 in the example of FIG. 8. Module 712-9 may include a GPS sensor, a real-time kinematic (RTK) sensor, an access point detection module, a signal triangulation module, a dead reckoning module, and/or other locational sensors or devices that are configured to determine a real-time geolocation of XR presentation system 302 that may be used by system 100 (e.g., to determine which MEC systems will provide the best performance, etc.) and/or by other components of XR presentation system 302 in ways described herein.

Module 712-10 represents a network communication module that operates on neck-mounted device 704 in the example of FIG. 7 and that operates in head-mounted device 802 in the example of FIG. 8. Module 712-10 may include a WiFi communication device that allows XR presentation system 302 to communicate by way of a local area network and/or to otherwise access the Internet 714. In this way, as shown, a cloud system 716 may be accessed that may perform similar functionality as MEC system 304 of cellular network 306, albeit without all the same benefits (e.g., without the same low latencies, etc.), as has been described. Because network communication modules generally communicate wirelessly with relatively localized routers and gateways (e.g., WiFi hot spots within the same room or building as the XR presentation system), antennas associated with these modules may be implemented in a head-mounted device such as head-mounted device 802 (although, as has been described, the head-mounted device may be made more streamlined and lightweight when such components are included in the neck-mounted device such as is shown in neck-mounted device 704).

In contrast, module 712-11 represents a cellular communication module that operates on the neck-mounted device in both examples. Module 712-11 provides wireless communication with MEC system 304 of cellular network 306, which may involve a cellular chipset and antenna that is associated with significantly more power dissipation, emissions, and so forth. As such, even in the bulkier version of head-mounted device 802 shown in FIG. 8, it has not been practical or possible for a cellular communication module such as module 712-11 to be implemented. Another reason for this is constraints imposed by cellular antenna radiation and SAR restrictions. XR presentation systems described herein that include separate head-mounted and neck-mounted devices may thus allow for cellular communication module 712-11 to be implemented and for XR presentation system 302 to continuously be connected both to MEC system 304, as well as to internet 714 and/or other such networks (by way of the connection to cellular network 306).

Like various modules 712 that have been described, system 100 is also shown to be implemented within neck-mounted device 704 in the example of FIG. 7 while being implemented within head-mounted device 802 in the example of FIG. 8. For example, system 100 may be implemented by software that is configured to perform operations described herein (e.g., the operations of method 200, etc.) and that executes on computer hardware such as the hardware of processing resources module 712-8. Along with other operations that have been described, system 100 may be configured to perform various tasks associated with discovering MEC systems (e.g., selecting one or more candidate MEC systems of cellular network 306 depending on latency and/or compute requirements, MEC permission policies, etc.); on-boarding applications (e.g., managing pre-boarded list of package names, categories, protocols, application profiles, etc.); MEC access control (e.g., either static or dynamic access control based on system conditions and/or computing task parameters that have been described); workload management (e.g., statically or dynamically allocating resources of XR presentation system 302 and/or MEC system 304), and any other tasks as may serve to provide operational support to an XR presentation system in a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
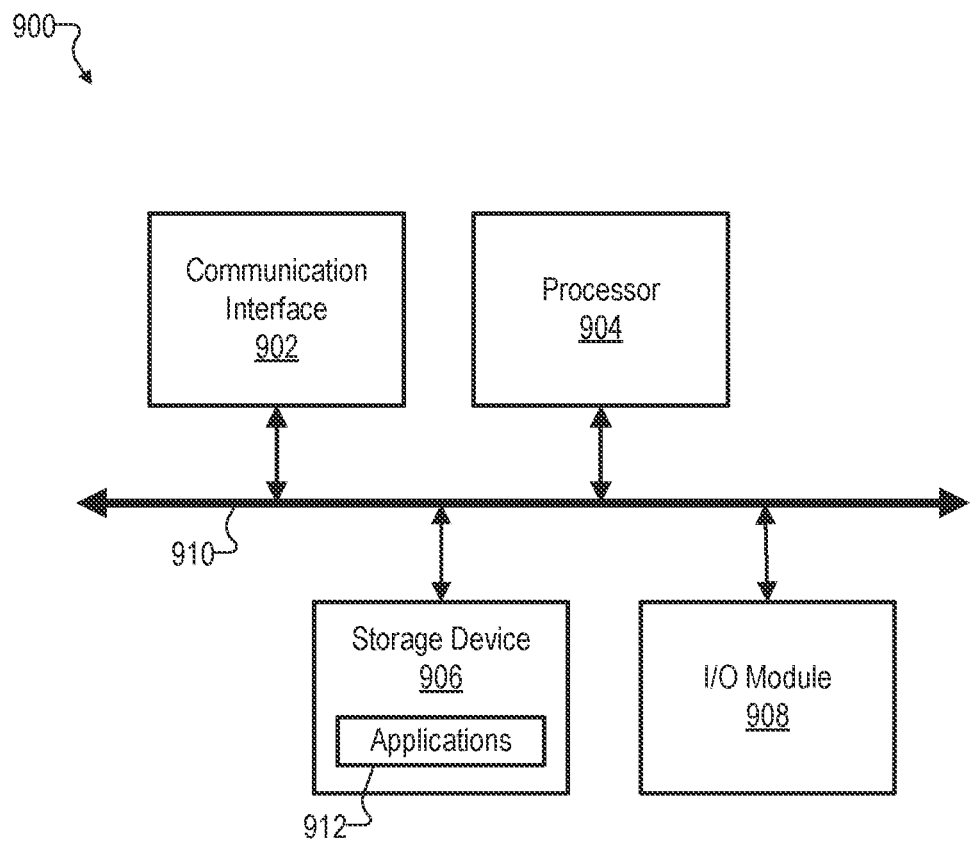
FIG. 9 shows an illustrative computing device that may implement augmented reality tracking systems and/or other systems and devices described herein in accordance with principles described herein.

FIG. 9 shows an illustrative computing device 900 that may implement XR support systems and/or other systems and devices described herein in accordance with principles described herein. For example, computing device 900 may include or implement (or partially implement) an XR support system such as system 100 or any component included therein or any system associated therewith (e.g., XR presentation system 302 or any subsystem or module thereof, MEC system 304, elements of cellular network 306 and/or Internet 714, etc.).

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
    establishing, by an extended reality (XR) support system, a first communicative link between an XR presentation system and a multi-access edge compute (MEC) system operating on a cellular network and a second communicative link between the XR presentation system and a cloud system accessible by way of a network distinct from the cellular network, wherein the XR presentation system comprises two separately-housed and communicatively-coupled subsystems including:
        a communication subsystem that is implemented by a neck-mounted device that includes a cellular communication module that provides the first communicative link by way of the cellular network, and
        a user interface subsystem that is implemented by a head-mounted device that is configured to function as an XR presentation system by itself without relying on the neck-mounted device and that includes a network communication module that provides the second communicative link by way of the network distinct from the cellular network;
    identifying, by the XR support system, a parameter associated with a computing task to be performed in connection with an XR experience presented by the XR presentation system;
    identifying, by the XR support system, a condition associated with a capability of the XR presentation system to perform the computing task or a capability of the MEC system to perform the computing task;
    selecting, by the XR support system based on the identified parameter and the identified condition, at least one of the XR presentation system or the MEC system to perform the computing task; and
    directing, by the XR support system, the selected at least one of the XR presentation system or the MEC system to perform the computing task.

2. The method of claim 1, wherein:
    for the selecting of the at least one of the XR presentation system or the MEC system to perform the computing task, the XR support system selects the MEC system to perform the computing task; and
    for the directing of the selected at least one of the XR presentation system or the MEC system to perform the computing task, the XR support system directs the MEC system to perform the computing task.

3. The method of claim 2, wherein the identified condition on which the selecting is based is a MEC status condition associated with the capability of the MEC system to perform the computing task, the MEC status condition indicating a processing resource availability of the MEC system.

4. The method of claim 1, wherein:
    for the selecting of the at least one of the XR presentation system or the MEC system to perform the computing task, the XR support system selects the XR presentation system to perform the computing task; and
    for the directing of the selected at least one of the XR presentation system or the MEC system to perform the computing task, the XR support system directs the XR presentation system to perform the computing task.

5. The method of claim 4, wherein the identified condition on which the selecting is based is a local resource availability condition associated with the capability of the XR presentation system to perform the computing task, the local resource availability condition indicating that, based on the parameter associated with the computing task, local resources available at the XR presentation system are sufficient to perform the computing task without assistance from the MEC system.

6. The method of claim 1, wherein the identified condition on which the selecting is based is at least one of:
  a device location condition indicative of a real-time location of the XR presentation system;
  a battery condition indicative of a battery level of the XR presentation system; or
  a communication latency condition indicative of a real-time latency between the XR presentation system and the MEC system.

7. The method of claim 1, wherein the user interface subsystem is configured to present visual content of the XR experience to a user of the XR presentation system and to detect movement of the user during the XR experience.

8. The method of claim 7, wherein:
  the head-mounted device presents the visual content to the user as the user wears the head-mounted device during the XR experience;
  the neck-mounted device is worn by the user during the XR experience and is physically connected to the head-mounted device by way of a cable;
  the XR support system is implemented by local processing resources of the neck-mounted device; and
  the neck-mounted device is further configured to supply battery power to the head-mounted device by way of the cable and to perform the computing task using the local processing resources when selected by the XR support system.

9. The method of claim 7, wherein:
  the head-mounted device that presents the visual content to the user as the user wears the head-mounted device during the XR experience;
  the neck-mounted device is worn by the user during the XR experience and is physically connected to the head-mounted device by way of a cable;
  the XR support system is implemented by local processing resources of the head-mounted device; and
  the neck-mounted device is further configured to supply battery power to the head-mounted device by way of the cable as the head-mounted device performs the computing task using the local processing resources when selected by the XR support system.

10. The method of claim 7, wherein:
  the communication subsystem lacks a display interface by way of which status data for the communication subsystem is presented to the user during the XR experience; and
  the user interface subsystem receives the status data from the communication subsystem and presents the status data to the user along with the visual content of the XR experience.

11. The method of claim 7, wherein:
  the head-mounted device presents the visual content to the user as the user wears the head-mounted device during the XR experience;
  the neck-mounted device is worn by the user during the XR experience and is physically connected to the head-mounted device by way of a cable; and
  the cable is shorter than approximately one foot in length.

12. A system comprising:
  a memory storing instructions; and
  a processor communicatively coupled to the memory and configured to execute the instructions to:
    establish a first communicative link between an extended reality (XR) presentation system and a multi-access edge compute (MEC) system operating on a cellular network and a second communicative link between the XR presentation system and a cloud system accessible by way of a network distinct from the cellular network, wherein the XR presentation system comprises two separately-housed and communicatively-coupled subsystems including:
      a communication subsystem that is implemented by a neck-mounted device that includes a cellular communication module that provides the first communicative link by way of the cellular network, and
      a user interface subsystem that is implemented by a head-mounted device that is configured to function as an XR presentation system by itself without relying on the neck-mounted device and that includes a network communication module that provides the second communicative link by way of the network distinct from the cellular network;
    identify a parameter associated with a computing task to be performed in connection with an XR experience presented by the XR presentation system;
    identify a condition associated with a capability of the XR presentation system to perform the computing task or a capability of the MEC system to perform the computing task;
    select, based on the identified parameter and the identified condition, at least one of the XR presentation system or the MEC system to perform the computing task; and
    direct the selected at least one of the XR presentation system or the MEC system to perform the computing task.

13. The system of claim 12, wherein:
  for the selecting of the at least one of the XR presentation system or the MEC system to perform the computing task, the processor executes the instructions to select the MEC system to perform the computing task; and
  for the directing of the selected at least one of the XR presentation system or the MEC system to perform the computing task, the processor executes the instructions to direct the MEC system to perform the computing task.

14. The system of claim 12, wherein:
  for the selecting of the at least one of the XR presentation system or the MEC system to perform the computing task, the processor executes the instructions to select the XR presentation system to perform the computing task; and
  for the directing of the selected at least one of the XR presentation system or the MEC system to perform the computing task, the processor executes the instructions to direct the XR presentation system to perform the computing task.

15. The system of claim 12, wherein the identified condition on which the selecting is based is at least one of:
  a device location condition indicative of a real-time location of the XR presentation system;
  a battery condition indicative of a real-time battery level of the XR presentation system; or
  a communication latency condition indicative of a real-time latency between the XR presentation system and the MEC system.

16. The system of claim 12, wherein the user interface subsystem is configured to present visual content of the XR experience to a user of the XR presentation system and to detect movement of the user during the XR experience.

17. The system of claim 16, wherein:
the head-mounted device that presents the visual content to the user as the user wears the head-mounted device during the XR experience;
the neck-mounted device is worn by the user during the XR experience and is physically connected to the head-mounted device by way of a cable shorter than approximately one foot in length;
the processor is included within local processing resources of the neck-mounted device; and
the neck-mounted device is further configured to supply battery power to the head-mounted device by way of the cable and to perform the computing task using the local processing resources when selected by the processor.

18. The system of claim 16, wherein:
the head-mounted device that presents the visual content to the user as the user wears the head-mounted device during the XR experience;
the neck-mounted device is worn by the user during the XR experience and is physically connected to the head-mounted device by way of a cable shorter than approximately one foot in length;
the processor is included within local processing resources of the head-mounted device; and
the neck-mounted device is further configured to supply battery power to the head-mounted device by way of the cable as the head-mounted device performs the computing task using the local processing resources when selected by the system.

19. A non-transitory computer-readable medium storing instructions that, when executed, direct a processor of a computing device to:
establish a first communicative link between an extended reality (XR) presentation system and a multi-access edge compute (MEC) system operating on a cellular network and a second communicative link between the XR presentation system and a cloud system accessible by way of a network distinct from the cellular network, wherein the XR presentation system comprises two separately-housed and communicatively-coupled subsystems including:
a communication subsystem that is implemented by a neck-mounted device that includes a cellular communication module that provides the first communicative link by way of the cellular network, and
a user interface subsystem that is implemented by a head-mounted device that is configured to function as an XR presentation system by itself without relying on the neck-mounted device and that includes a network communication module that provides the second communicative link by way of the network distinct from the cellular network;
identify a parameter associated with a computing task to be performed in connection with an XR experience presented by the XR presentation system;
identify a condition associated with a capability of the XR presentation system to perform the computing task or a capability of the MEC system to perform the computing task;
select, based on the identified parameter and the identified condition, at least one of the XR presentation system or the MEC system to perform the computing task; and
direct the selected at least one of the XR presentation system or the MEC system to perform the computing task.

20. The non-transitory computer-readable medium of claim 19, wherein the user interface subsystem is configured to present visual content of the XR experience to a user of the XR presentation system and to detect movement of the user during the XR experience.

* * * * *